United States Patent Office 2,973,377
Patented Feb. 28, 1961

2,973,377

11β,12β-EPOXY AND 12α-BROMO STEROIDS OF THE PREGNANE SERIES AND THEIR METHOD OF PREPARATION

Josef Fried, New Brunswick, and Patrick A. Diassi, Westfield, N.J., assignors to Olin Mathieson Chemical Corporation, New York, N.Y., a corporation of Virginia No Drawing. Filed June 21, 1957, Ser. No. 667,289

13 Claims. (Cl. 260—397.45)

This invention relates to the synthesis of valuable steroids; and has for its object the provision of (I) an advantageous process of preparing steroids of the pregnene series having a 12α-halogen substituent and an 11β-hydroxy substituent; and of (II) certain steroids useful in the preparation of these physiologically active steroid derivatives.

The process of this invention essentially comprises: (a) reducing and dehydrobrominating 12α-bromopregnane-3α-ol-11,20-dione, a 3-ester thereof, or 12α-bromopregnane-3α-20-diol-11-one to 11β,12β-epoxypregnane-3α,20-diol, either directly or through the 12α-bromopregnane-3α,11β,20-triol intermediate, and (b) oxidizing the resultant 11β,12β-epoxypregnane-3α,20-diol to 11β,12β-epoxypregnane-3,20-dione, a known intermediate in the preparation of 12α-halo-11β-hydroxy-progesterones (see the application of Herz et al., Serial No. 519,682, filed July 1, 1955).

This series of steps may be represented by the following schematic analysis:

The new compounds of this invention are represented by the Formulae IV and V, wherein the 20-hydroxy group can be in either the alpha or beta position.

To prepare the 11β,12β-epoxypregnane-3α,20-diols of this invention an ester of 12α-bromopregnane-3α-ol-11,20-dione (e.g., an ester with a hydrocarbon carboxylic acid of less than ten carbon atoms as exemplified by the lower alkanoic acids) can be reduced by treatment with a reducing agent such as a complex metal hydride (e.g. lithium borohydride) and the resulting mixture containing the 12α-bromopregnane-3α,11β,20-triols and their 3-esters can then be hydrolyzed and dehydrobrominated by treatment with a basic reagent, such as potassium hydroxide or a salt of a strong base and weak acid (e.g. potassium carbonate), to the 11β,12β-epoxypregnane-3α,20-diol derivatives.

The 11β,12β-epoxypregnane-3α,20-diols can also be prepared by treating 12α-bromopregnane-3α-ol-11,20-dione with a reducing agent such as a complex metal hydride (e.g. lithium borohydride) whereby a mixture of the 12α-bromopregnane-3α,11β,20-triols and 11β,12β-epoxypregnane-3α,20-diols is formed. The 12α-bromo derivatives can then be converted in situ to the epoxy derivatives by treatment with a basic reagent, such as potassium hydroxide or a salt of a strong base and weak acid (e.g. potassium carbonate).

The conversion of 12α-bromopregnane-3α-ol-11,20-dione to a mixture of 12α-bromopregnane-3α,11β,20-triol and 11β,12β-epoxypregnane-3α,20β-diol can also be done stepwise by first reducing the 12α-bromopregnane-

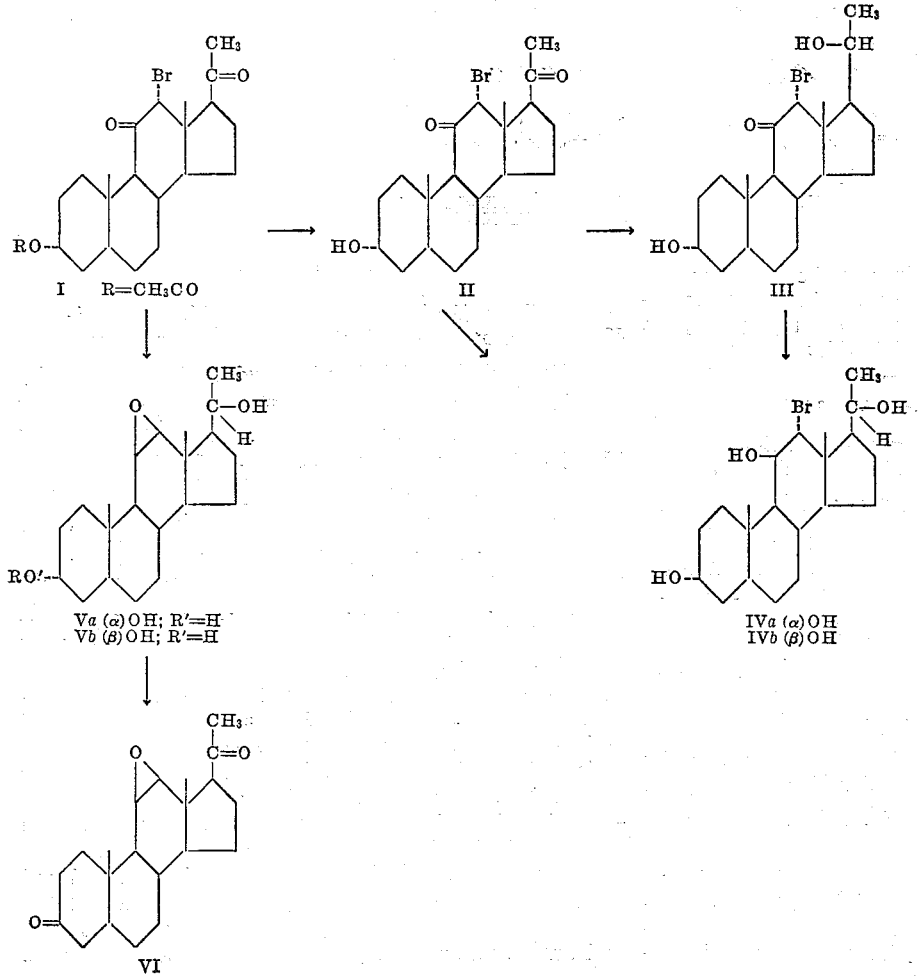

3α-ol-11,20-dione to 12α-bromopregnane-3α,20β-diol-11-one by treatment with sodium borohydride at a low temperature (e.g. 0° C. or less) and then reacting the latter with a complex metalhydride such as lithium borohydride and if desired, a hydrolyzing agent as described hereinbefore.

The 11β,12β-epoxypregnane-3α,20-diols are then oxidized, as by treatment with a hexavalent chromium compound (e.g. chromic anhydride), the reaction preferably being conducted at a low temperature (e.g. 0° C. or less) employing a dilute solution of the chromic compound in an organic solvent, such as acetone. The reaction yields 11β,12β-epoxypregnane-3,20-dione which then can be converted to the 12α-halo-11β-hydroxyprogesterones as described in said application, Serial No. 519,682.

11β,12β-epoxypregnane-3,20-dione can also be converted to the 12α-halo-11β-hydroxyprogesterones via the new intermediate 4β,12α-dibromopregnane-11β-ol-3,20-dione, which is formed by treatment of 11β,12β-epoxypregnane-3,20-dione with hydrogen bromide and bromine in an acid solution.

The 4β,12α-dibromopregnane-11β-ol-3,20-dione is then heated with a lithium halide (e.g. lithium bromide and lithium chloride) in a solvent of high dielectric constant, such as dimethyl formamide, whereby the corresponding 12α-halo-11β-hydroxyprogesterone (e.g., 12α-bromo-11β-hydroxyprogesterone and 12α-chloro-11β-hydroxyprogesterone) is formed.

This series of steps can be represented by the following schematic analysis:

ed dropwise. The mixture is stirred at 0° for 5 hours and the excess lithium borohydride is then decomposed by the cautious addition of 10% acetic acid (approximately 5 ml. required). The solution is diluted with water (20 ml.), extracted with chloroform (3 x 58 ml.) and the combined chloroform extracts washed with water (100 ml.) and evaporated to dryness in vacuo.

The residue consisting of a mixture of 12α-bromopregnane-3α-11β,20α-triol (IVa), 12α-bromopregnane-3α,11β,20β-triol (IVb), 11β,12β-epoxypregnane-3α,20α-diol (Va), and 11β,12β-epoxypregnane-3α,20β-diol (Vb) is redissolved in 40 ml. methanol and 10% $K_2CO_3$ (4 ml.) is added dropwise with stirring. After 20 minutes the solution is neutralized with 10% acetic acid, water (40 ml.) is added and the methanol removed in vacuo. The residue is extracted with chloroform (2 x 50 ml.) and the chloroform extracts are evaporated to dryness. The residue is crystallized from acetone-hexane to give 11β,12β-epoxypregnane-3α,20β-diol (Vb) about (298 mg.) melting at 195–196°; $[a]_D^{28}$ +36.7° (c., 0.464 in ethanol);

$\lambda_{max.}^{Nujol}$ 3.00μ

*Analysis.*—Calcd. for $C_{21}H_{34}O_3$ (334.48): C, 75.40; H, 10.24. Found: C, 75.30; H, 10.00.

Concentration of the mother liquors gives 11β,12β-epoxypregnane-3α,20α-diol (Va) about (8 mg.) melting at 218–220° C.; $[a]_D^{22}$ +47.1° (MeOH);

$\lambda_{max.}^{Nujol}$ 3.00μ

*Analysis.*—Calculated for $C_{21}H_{34}O_3$ (334.48): C, 75.40; H, 10.24. Found: C, 75.33; H, 9.83.

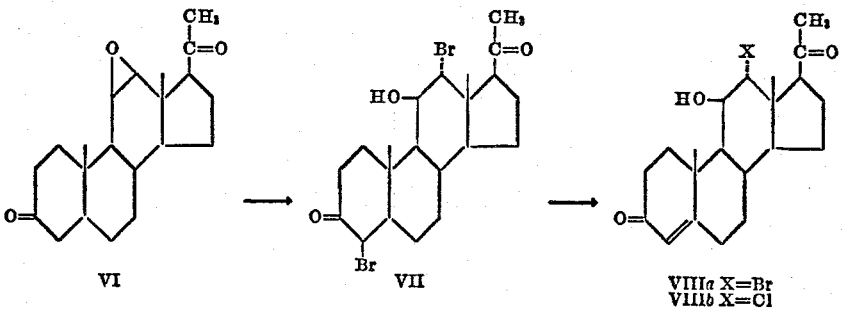

VI → VII → VIIIa X=Br / VIIIb X=Cl

The following examples illustrate the invention (all temperatures being in centigrade). The first three examples disclose alternative processes for preparing the 11β,12β-epoxypregnane-3α,20-diols (V):

EXAMPLE 1

(a) *12α-bromopregnane-3α-ol-11,20-dione (II)*

A suspension of 12α-bromopregnane-3α-ol-11,20-dione 3-acetate (I) (10.0 g.) in 0.275 N perchloric acid in methanol (200 ml.) is stirred at room temperature for 63 hours. The clear solution is then adjusted to pH 6.0 with 5% $NaHCO_3$, diluted with water (200 ml.) and extracted with chloroform (3 x 300 ml.). The combined chloroform extracts are washed with water (500 ml.), and evaporated to dryness in vacuo. Crystallization from acetone-hexane gives the pure 3α-ol (II) about (7.19 g.) melting at about 158–160°; $[a]_D^{26}$ +9.43° (c., 0.525 in $CHCl_3$);

$\lambda_{max.}^{Nujol}$ 2.95, 5.85, 5.90μ

*Analysis.*—Calcd. for $C_{21}H_{31}O_3Br$ (411.38): C, 61.31; H, 7.59; Br, 19.40. Found: C, 61.72; H, 7.44; Br, 19.49.

(b) *11β,12β-epoxypregnane-3α,20-diol from 12α-bromopregnane-3α-ol-11,20-dione (II)*

To a stirred solution of lithium borohydride (256 mg.) in dry tetrahydrofuran (30 ml.) cooled to 0° by an ice-salt bath, a solution of 12α-bromopregnane-3α-ol-11,20-dione (486 mg.) in dry tetrahydrofuran (20 ml.) is add-

EXAMPLE 2

*From 12α-bromopregnane-3α-ol-11,20-dione 3-acetate (I) via lithium borohydride reduction*

To a solution of lithium borohydride (400 mg.) in dry tetrahydrofuran (25 ml.) cooled in an ice bath, a solution of 12α-bromopregnane-3α-ol-11,20-dione 3-acetate (1.00 g.) in dry tetrahydrofuran is added dropwise, with stirring. After stirring at 0° for 5 hours the reaction is completed as described in Example 1b for the 3-ol to give 11β,12β-epoxypregnane-3α, 20β-diol (Vb) about (356 mg.), M.P. about 196–198° and 11β,12β-epoxypregnane-3α,20α-diol (Va) about (12 mg.) M.P. at 218–220°.

The residue obtained by evaporating the mother liquor of crystallization to dryness in vacuo contains residual amounts of the above mentioned products as well as 11β, 12β-epoxypregnane-3α,20β-diol 3-acetate and 11β,12β-epoxypregnane-3α,20α-diol 3-acetate. This is dissolved in methanol (30 ml.), 10% potassium carbonate (10 ml.) is added and the mixture is left at room temperature overnight. The solution is then neutralized with 10% acetic acid and the methanol removed in vacuo. The residue is distributed between chloroform (30 ml.) and water (30 ml.), the chloroform layer is separated and the solvent evaporated to dryness. An additional 175 mg. of 11β,12β-epoxypregnane-3α,20β-diol is obtained from the residue by crystallization from acetone-hexane.

EXAMPLE 3

*From 12α-bromopregnane-3α-ol-11,20-dione (II) via sodium borohydride followed by lithium borohydride reduction*

To a solution of sodium borohydride (309 mg.) in tetrahydrofuran (25 ml.) and water (5 ml.) a solution of 12α-bromopregnane-3α-ol-11,20-dione (605 mg.) in tetrahydrofuran (10 ml.) is added and the resulting mixture is left at room temperature for 5 hours. The excess reducing agent is decomposed with 10% acetic acid and the tetrahydrofuran is removed in vacuo. The residue is extracted with chloroform, the chloroform phase is washed with water and evaporated to dryness in vacuo. The residue is crystallized from aqueous methanol to give 12α-bromopregnane-3α,20β-diol-11-one (III) 300 mg.) melting at 237–237.5° $[α]_D^{25}$ —33.0° (ethanol);

$λ_{max.}^{Nujol}$ 3.00, 5.85µ

*Analysis.*—Calcd. for $C_{21}H_{33}O_3Br$ (413.39): C, 61.01; H, 8.04; Br, 19.33. Found: C, 61.42; H, 8.10; Br, 19.35.

Isopropanol may be substituted as solvent in place of the tetrahydrofuran water mixture. Under these conditions the reaction is run at room temperature for 21 hours.

Further reduction of 12α-bromopregnane-3α,20β-diol-11-one by lithium borohydride in tetrahydrofuran as described in Example 1b followed by epoxidation with potassium carbonate gives 11β,12β-epoxypregnane-3α,20β-diol (Vb).

EXAMPLE 4

*11β,12β-epoxypregnane-3,20-dione (VI)*

To a stirred solution of 1.0 g. of 11β,12β-epoxypregnane 3α,20β-diol (Vb) in 100 ml. of acetone cooled in an ice bath, a solution containing chromic anhydride (430 mg.), sulfuric acid (689 mg.) and water (2.3 g.) in 20 ml. acetone is added dropwise. After 20 minutes the excess oxidizing agent is reduced with ethanol and the precipitated chromic sulfate is filtered and washed with acetone. The filtrate is diluted with water (100 ml.) and the acetone removed in vacuo. The residue is extracted with chloroform (2 x 100 ml.) and the combined chloroform extract are washed with water (2 x 100 ml.) and evaporated to dryness in vacuo. Crystallization from acetone-hexane gives platelets of 11β,12β-epoxypregnane-3,20-dione (VI) about (583 mg.) melting at about 143–144°. The infrared spectrum of this compound is identical with that of an authentic sample.

In like manner 11β,12β-epoxypregnane-3α,20α-diol (Va) can be oxidized to 11β,12β-epoxypregnane-3,20-dione.

EXAMPLE 5

*4β,12α-dibromopregnane-11β-ol-3,20-dione (VII)*

To a solution of 213 mg. of 11β,12β-epoxypregnane-3,20-dione in 15 ml. of glacial acetic acid is added 0.2 ml. of 11% hydrogen bromide in acetic acid and shortly thereafter 1.13 ml. of a solution containing bromine (98.2 mg./ml.) in glacial acetic acid is added dropwise with stirring. After the addition is completed, the reaction is allowed to proceed for 10 minutes at room temperature. 3 ml. of 10% sodium acetate solution is then added until the straw-yellow color disappears. The acetic acid solution is concentrated in vacuo, the concentrate taken up in 25 ml. of chloroform, washed with water (2 x 25 ml.), dilute sodium bicarbonate, and again with water, dried over sodium sulfate and the solvent evaporated to dryness in vacuo. The residue is crystallized from acetone-hexane to give pure 4β,12α-dibromopregnane-11β-ol-3,20-dione (VII) (about 218 mg.), M.P. about 212–214° (dec.);

$λ_{max.}^{Nujol}$ 2.96, 5.78, 5.93µ

$[α]_D^{24}$ +80° (c., 1.24 in chloroform).

*Analysis.*—Calcd. for $C_{21}H_{30}O_3Br_2$ (490.28): C, 51.45; H, 6.16; Br. 32.60. Found: C, 51.19; H, 6.31; Br. 33.16.

In place of acetic acid alone as solvent for the bromination, chloroform may be added up to a 1:1 ratio of the two solvents.

EXAMPLE 6

*12α-bromo-11β-hydroxyprogesterone (VIIIa)*

To a hot solution of lithium bromide (2.49 g.) in dimethylformamide (24 ml.) 4β,12α-dibromopregnane-11β-ol-3,20-dione (475 mg.) is added and the resulting solution heated on a steam bath for 4 hours. Water (30 ml.) is added to the hot solution and on cooling crystalline platelets separate. The 12α-bromo-11β-hydroxyprogesterone is filtered, washed with water and dried, weight about 313 mg., M.P. 213–215°;

$λ_{max.}^{Nujol}$ 2.95, 5.92–5.97, 6.16µ

Its infrared spectrum is identical with that of an authentic sample.

EXAMPLE 7

*12α-chloro-11β-hydroxyprogesterone (VIIIb)*

A solution of 30 mg. of 4β,12α-dibromopregnane-11β-ol-3,20-dione and 79 mg. of lithium chloride in 1.5 ml. of dimethylformamide is heated on the steam bath for two hours. The solution is then cooled, diluted with water and the resulting crystals filtered off and washed with water. The dried crystals after recrystallization from acetone-hexane melt at 230–231°. The infrared spectrum is identical with that of an authentic sample of 12α-chloro-11β-hydroxyprogesterone.

The invention may be variously otherwise embodied within the scope of the appended claims.

What is claimed is:

1. 12α-bromopregnane-3α,11β,20-triol.
2. 4β,12α-dibromopregnane-11β-ol-3,20-dione.
3. A process for preparing 12α-bromopregnane-3α,11β,20β-triol, which comprises reducing 12α-bromopregnane-3α,20β-diol-11-one with lithium borohydride.
4. A process for preparing 11β,12β-epoxypregnane-3,20-dione, which comprises treating 11β,12β-epoxypregnane-3α,20-diol with chromic anhydride and recovering the 11β,12β-epoxypregnane-3,20-dione formed.
5. A process for preparing 4β,12α-dibromopregnane-11β-ol-3,20-dione, which comprises treating 11β,12β-epoxypregnane-3,20-dione with hydrogen bromide and bromine in an acidic medium.
6. A process for preparing a 12α-halo-11β-hydroxyprogesterone wherein the halo radical is selected from the group consisting of bromo and chloro, which comprises treating 4β,12α-dibromopregnane-11β-ol-3,20-dione with a lithium halide selected from the group consisting of lithium bromide and lithium chloride in an organic solvent of high dielectric constant.
7. A process for preparing 12α-bromo-11β-hydroxyprogesterone, which comprises treating 4β,12α-dibromopregnane-11β-ol-3,20-dione with lithium bromide in dimethyl formamide.
8. A process for preparing 12α-chloro-11β-hydroxyprogesterone which comprises treating 4β,12α-dibromopregnane-11β-ol-3,20-dione with lithium chloride in dimethyl formamide.
9. A process for preparing an 11β,12β-epoxypregnane-3α,20-diol which comprises treating a compound selected from the group consisting of 12α-bromopregnane-3α-ol-11,20-dione and 3-esters thereof, with lithium borohydride and dehydrobrominating the resulting compound by treatment with potassium carbonate.
10. A process for preparing 11β,12β-epoxypregnane-3α,20β-diol which comprises treating 12α-bromopregnane-3α,20β-diol-11-one with lithium borohydride and dehydrobrominating the resulting compound by treatment with potassium carbonate.
11. A process for preparing 12α-bromopregnane- $3\alpha,11\beta,20$-triols, which comprises reducing $12\alpha$-bromopregnane-$3\alpha$-ol-11,20-dione by treatment with lithium borohydride and recovering the $12\alpha$-bromopregnane-$3\alpha,11\beta,20$-triols formed.

12. A process for preparing an $11\beta,12\beta$-epoxypregnane-$3\alpha,20$-diol which comprises treating a compound selected from the group consisting of $12\alpha$-bromopregnane-$3\alpha$-ol-11,20-dione and the 3-esters thereof with lithium borohydride and dehydrobrominating the resulting compound by treatment with a basic reagent.

13. A process for preparing $11\beta,12\beta$-epoxypregnane-$3\alpha,20\beta$-diol which comprises treating $12\alpha$-bromopregnane-$3\alpha,20\beta$-diol-11-one with lithium borohydride and dehydrobrominating the resulting compound by treatment with a basic reagent.

References Cited in the file of this patent

UNITED STATES PATENTS

| | | |
|---|---|---|
| 2,403,683 | Reichstein | July 9, 1946 |
| 2,447,325 | Gallagher | Aug. 17, 1948 |
| 2,776,302 | Ruzicka et al. | Jan. 1, 1957 |